April 3, 1956 W. B. EDWARDS 2,740,223
FISH HOLDING HOOK ASSEMBLY
Filed Dec. 22, 1952

INVENTOR.
William B. Edwards
BY
Patrick D. Beavers
ATTORNEY

United States Patent Office 2,740,223
Patented Apr. 3, 1956

2,740,223
FISH HOLDING HOOK ASSEMBLY
William Bertelle Edwards, Tallahassee, Fla.

Application December 22, 1952, Serial No. 327,272

1 Claim. (Cl. 43—37)

This invention relates to improvements in the art of hunting and fishing and more particularly to a fish holding hook assembly.

The principal object of the present invention is to provide a fish holding hook assembly which is constructed in such a manner as to cause a fish to be held behind its gills when caught, thus precluding the possibility of the fish escaping.

Another important object of the invention is to provide a fish holding hook assembly which is simpler and of low cost to manufacture than devices of this kind heretofore marketed.

Still another object of the invention is to provide a fish holding hook assembly of the character stated which is not only of simple construction but positive acting and substantially foolproof in operation.

These and various other objects and advantages of the invention will become apparent to the reader of the following description.

Figure 1:
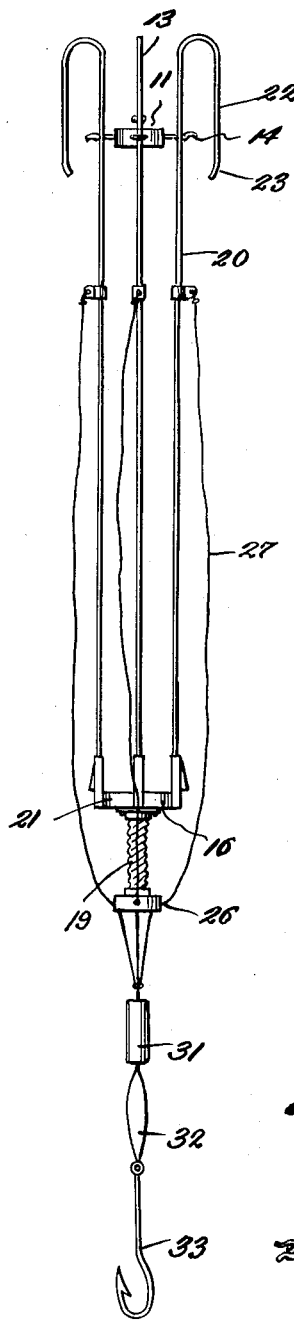
Figure 1 is a side elevational view of the fish holding and hook assembly set for operation.

Referring to the drawing wherein like numerals designate like parts, it can be seen that numeral 10 denotes an elongated rod having a head 11. This head may be secured to the rod in any desired manner and the rod has an eye 12 to which a fish line 13 is secured.

Figure 2:
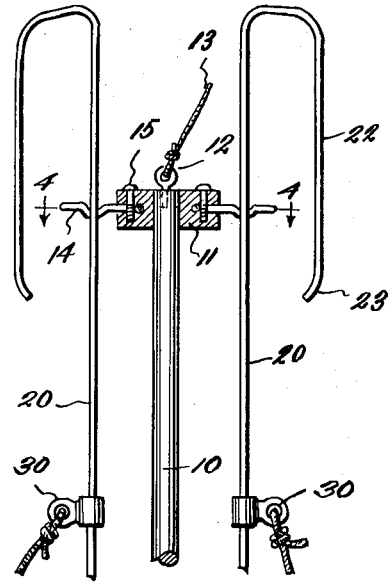
Figure 2 is a fragmentary side elevational view of the upper portion of the device with a part in section.
Figure 3:
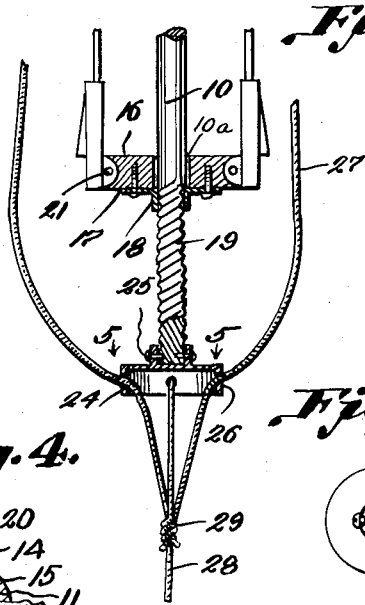
Figure 3 is a fragmentary side elevational view of the lower portion of the device with a portion in section.
Figure 4:
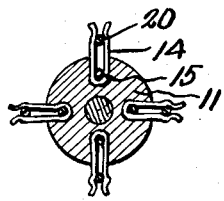
Figure 4 is a section taken on line 4—4 of Figure 2.
Figure 5:
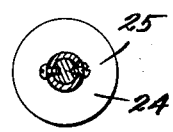
Figure 5 is a section taken on line 5—5 of Figure 3.

As shown in Figures 2 and 4, a plurality of two-legged spring clips 14 radiate from the head 11, the head 11 being formed with recesses to receive the bight portions of these clips 14. Screws or like securing means 15 serve to retain these clips in the head 11. The clips are outstanding and radiate from the head 11 as suggested in Figure 4.

Spaced downwardly and adjacent the lower end of the rod 10 is a hub 16, having an oversized opening 10a therein for receiving the rod 10. Secured to the bottom portion of this hub 16 is a plate 17 having an internally threaded collar 18 for riding engagement with a spiral portion 19 at the lower end of the rod 10.

A plurality of arms 20 have their lowered ends pivotally connected as at 21 to the hub 16, these arms being provided with backwardly bent hook portions 22 at the outer ends thereof, the tip portions being curved inwardly as at 23.

A cylindrical or cup-shaped shell 24 is secured by screws 25 to the lower end of the rod 10, and this shell is formed with a plurality of openings 26 through which cords 27 extend. These cords being knotted or otherwise fastened together and to a line 28, as at 29. The upper ends of these cords fasten to eye members 30 which are affixed to the medial portions of the arms 20, as shown in Figures 1 and 2.

The line 28 connects to a sinker or weight 31 and from there a leader 32 connects to a conventional fish hook 33.

In the use and operation of this device, the hub 16 is spiralled or rotated downwardly or upwardly on the spiral portion 19 of the rod 10 to position the arms 20 in such a manner as to acquire the desired throw of the arms and the hooks 22 in engaging fish of various size. The arms 20 are then swung upwardly and engaged in the clips 14, as in the manner shown in Figures 1 and 2. When a fish bites on the hook 33 a pull is exerted on the leader 32 and cords 27. This pull on the cords 27 disengages the arm 20 from the spring clip 14, pulling the same downwardly with the result that the hooks 22 engage behind the gills of the fish and into the gills preventing the fish from getting away even if he does detach the hook from his mouth, although this engagement of the hooks 22 will tend to neutralize the fish so that he will not have an opportunity to shake loose from the hook 33.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A fish holding and hook assembly comprising a rod having a plurality of clips thereon, said rod being provided with a hub, a plurality of hook carrying arms pivotally secured to the hub and adapted to be held by said clips, a fish hook, a plurality of lines connected to the arms and to said fish hook, said lines being adapted to pull said arms loose from the clips when a fish is caught by the fish hook and to move the hook end of said arms to the gill portion of the caught fish, said rod being provided with a spiral formation, and said hub being provided with a spiral form engaged with the spiral formation of the rod to provide for adjustment of the hub and arms on said rod.

References Cited in the file of this patent
UNITED STATES PATENTS

| | | |
|---|---|---|
| 286,494 | Skinner | Oct. 9, 1883 |
| 625,742 | Cartier | May 30, 1899 |
| 811,555 | Freel | Feb. 6, 1906 |
| 875,777 | Callahan | Jan. 7, 1908 |

FOREIGN PATENTS

| | | |
|---|---|---|
| 54,864 | Norway | Feb. 4, 1935 |